(12) United States Patent
Shioya et al.

(10) Patent No.: US 12,337,731 B2
(45) Date of Patent: Jun. 24, 2025

(54) SEAT ROTATING DEVICE

(71) Applicant: TOYOTA BOSHOKU KABUSHIKI KAISHA, Aichi-ken (JP)

(72) Inventors: Ryosuke Shioya, Aichi-ken (JP); Sadao Ito, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 187 days.

(21) Appl. No.: 18/201,893

(22) Filed: May 25, 2023

(65) Prior Publication Data

US 2023/0415617 A1    Dec. 28, 2023

(30) Foreign Application Priority Data

Jun. 22, 2022 (JP) ................................. 2022-100144

(51) Int. Cl.
*B60N 2/14* (2006.01)

(52) U.S. Cl.
CPC ..................... *B60N 2/14* (2013.01)

(58) Field of Classification Search
CPC ........ B60N 2/14; B60N 2/146; B60N 2/3052; B61D 33/0085; A61G 5/1072
USPC .................................................... 297/344.21
See application file for complete search history.

(56) References Cited

U.S. PATENT DOCUMENTS

| | | | | |
|---|---|---|---|---|
| 2010/0253123 | A1* | 10/2010 | DeCraene | B60N 2/062 297/344.21 |
| 2016/0016489 | A1* | 1/2016 | Lemay | B60N 2/245 297/344.21 |
| 2019/0143845 | A1* | 5/2019 | Akaike | B60N 2/06 297/240 |
| 2021/0394648 | A1* | 12/2021 | Vetere | B60N 2/146 |
| 2022/0227264 | A1* | 7/2022 | Mochizuki | B60N 2/146 |
| 2022/0332223 | A1* | 10/2022 | Ito | B60N 2/02253 |
| 2023/0294570 | A1* | 9/2023 | Line | B60N 2/14 297/344.21 |
| 2023/0415617 | A1* | 12/2023 | Shioya | B60N 2/14 |
| 2023/0415618 | A1* | 12/2023 | Mizuno | B60N 2/0224 |
| 2024/0399939 | A1* | 12/2024 | Miyoshi | B60N 2/0244 |
| 2025/0018839 | A1* | 1/2025 | Kim | B60N 2/0705 |

FOREIGN PATENT DOCUMENTS

| | | | |
|---|---|---|---|
| JP | 2009149219 A | * | 7/2009 |
| JP | 2022-78502 A | | 5/2022 |

* cited by examiner

*Primary Examiner* — Jose V Chen
(74) *Attorney, Agent, or Firm* — Greenblum & Bernstein, P.L.C.

(57) ABSTRACT

A seat rotating device includes a base plate, a rotating plate, and a coupling unit. The coupling unit includes a rotation link including a fixing end and a rotating end, a guide rail fixed to the base plate, the guide rail being in a linearly extending shape, a support slider movable along the guide rail, the support slider supporting the rotating end, a connection member that connects the support slider and the rotation link to each other, a lower rail, and an upper slider. The connection member is constructed to accommodate variation in distance between the rotating end and the support slider that is produced when the rotating end and the support slider move with respect to the base plate.

4 Claims, 11 Drawing Sheets

SEAT ROTATING DEVICE

CROSS REFERENCE TO RELATED APPLICATIONS

This nonprovisional application is based on Japanese Patent Application No. 2022-100144 filed with the Japan Patent Office on Jun. 22, 2022, the entire contents of which are hereby incorporated by reference.

BACKGROUND

Field

This disclosure relates to a seat rotating device.

Description of the Background Art

A seat rotating device capable of rotating a seat body between a seating position and a getting-on and -off position has conventionally been known. For example, Japanese Patent Laying-Open No. 2022-78502 discloses a seat rotating device including a base plate, a rotating plate, and a coupling unit. The base plate is fixed to a floor of a vehicle. The rotating plate is fixed to a lower surface of the seat body. The coupling unit couples the base plate and the rotating plate to each other such that the rotating plate is rotatable with respect to the base plate between the seating position and the getting-on and -off position. The coupling unit includes a link. The link includes a rotating end rotatable around a fixing end. A through hole for guiding movement of the rotating end is provided in the base plate. The through hole is provided in an arc shape in conformity with a locus of movement of the rotating end.

SUMMARY

Since the through hole in the arc shape is provided in the base plate in the seat rotating device described in Japanese Patent Laying-Open No. 2022-78502, there is a concern about lowering in rigidity of the base plate. In order to address this, a guide rail in an arc shape may be provided on an upper surface of the base plate as means for guiding movement of the rotating end and a slider movable along the guide rail may support the rotating end. This structure, however, requires accurate calculation of a locus of the guide rail, and precise working of the guide rail and the slider is required for ensuring smooth movement of the slider along the guide rail.

An object of the present disclosure is to provide a seat rotating device that allows relatively easy design of a guide rail and a support slider while rigidity of a base plate is ensured.

A seat rotating device according to one aspect of this disclosure is a seat rotating device that rotates a seat body between a seating position where the seat body faces the front of a vehicle and a getting-on and -off position where the seat body faces an opening of a door of the vehicle. The seat rotating device includes a base plate fixed to a floor of the vehicle, a rotating plate fixed to a lower surface of the seat body so as not to rotate relatively to the seat body, and a coupling unit that couples the base plate and the rotating plate to each other such that the rotating plate is rotatable with respect to the base plate between the seating position and the getting-on and -off position. The coupling unit includes a rotation link that couples the base plate and the rotating plate to each other, the rotation link including a fixing end and a rotating end, the fixing end being fixed to the base plate as being rotatable relatively to the base plate, the rotating end being fixed to the rotating plate as being pivotable with respect to the base plate around the fixing end and rotatable relatively to the rotating plate, a guide rail fixed to the base plate, the guide rail being in a linearly extending shape, a support slider movable along the guide rail, the support slider supporting the rotating end, a connection member that connects the support slider and the rotation link to each other, the connection member connecting the support slider and the rotation link to each other such that the rotating end is rotatable relatively to the connection member, a lower rail fixed to the base plate, and an upper slider movable along the lower rail, the upper slider supporting the rotating plate such that the rotating plate is rotatable relatively to the upper slider. The rotating plate includes a first supported portion supported by the rotating end and a second supported portion distant from the first supported portion, the second supported portion being supported by the upper slider. The upper slider allows movement of the second supported portion along the lower rail while the upper slider allows rotation of the rotating plate relatively to the upper slider in a direction identical to a direction of rotation of the rotating plate with respect to the rotating end when the rotating plate moves from the seating position to the getting-on and -off position. The connection member is constructed to accommodate variation in distance between the rotating end and the support slider that is produced when the rotating end and the support slider move with respect to the base plate.

The foregoing and other objects, characteristics, aspects, and advantages of the present invention will become more apparent from the following detailed description of the present invention when taken in conjunction with the accompanying drawings.

DESCRIPTION OF THE PREFERRED EMBODIMENTS

An embodiment of the present disclosure will be described with reference to the drawings. In the drawings referred to below, the same or corresponding members have the same reference characters allotted.

First Embodiment

Figure 1:
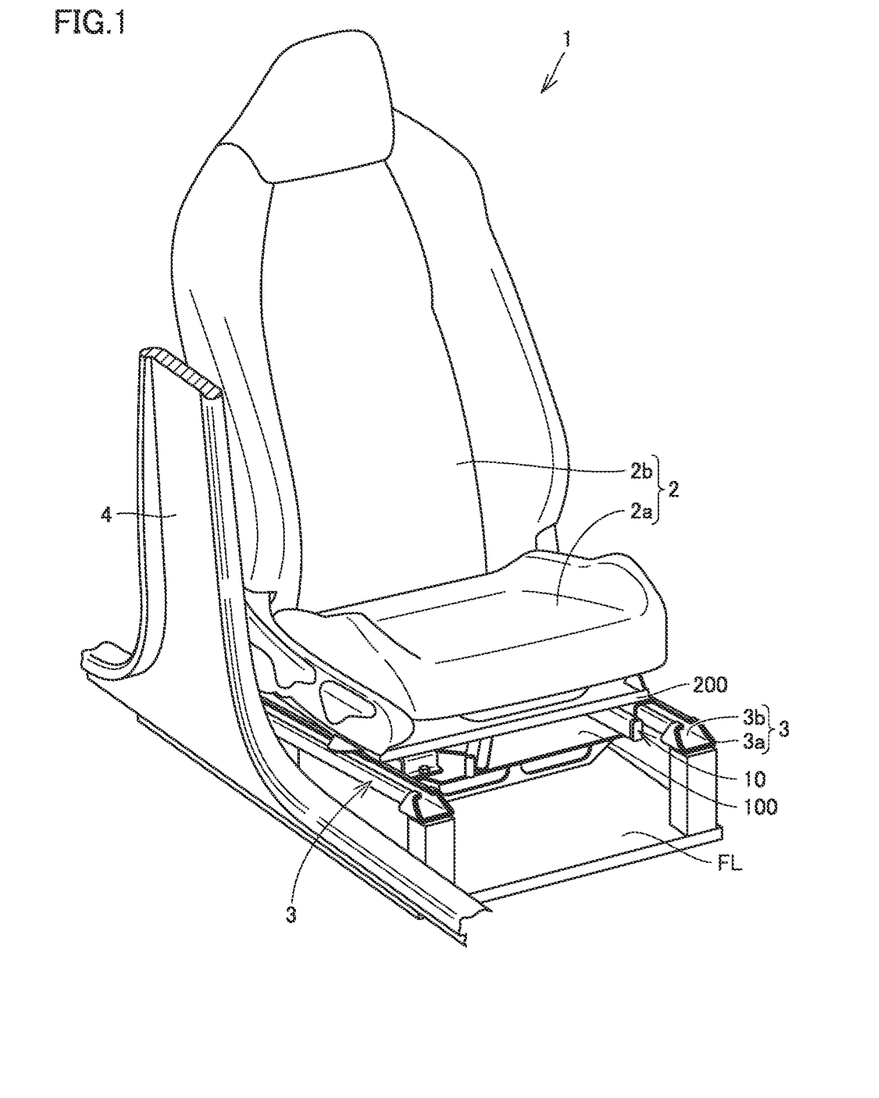
FIG. 1 is a perspective view of a rotary seat at a seating position.
Figure 2:
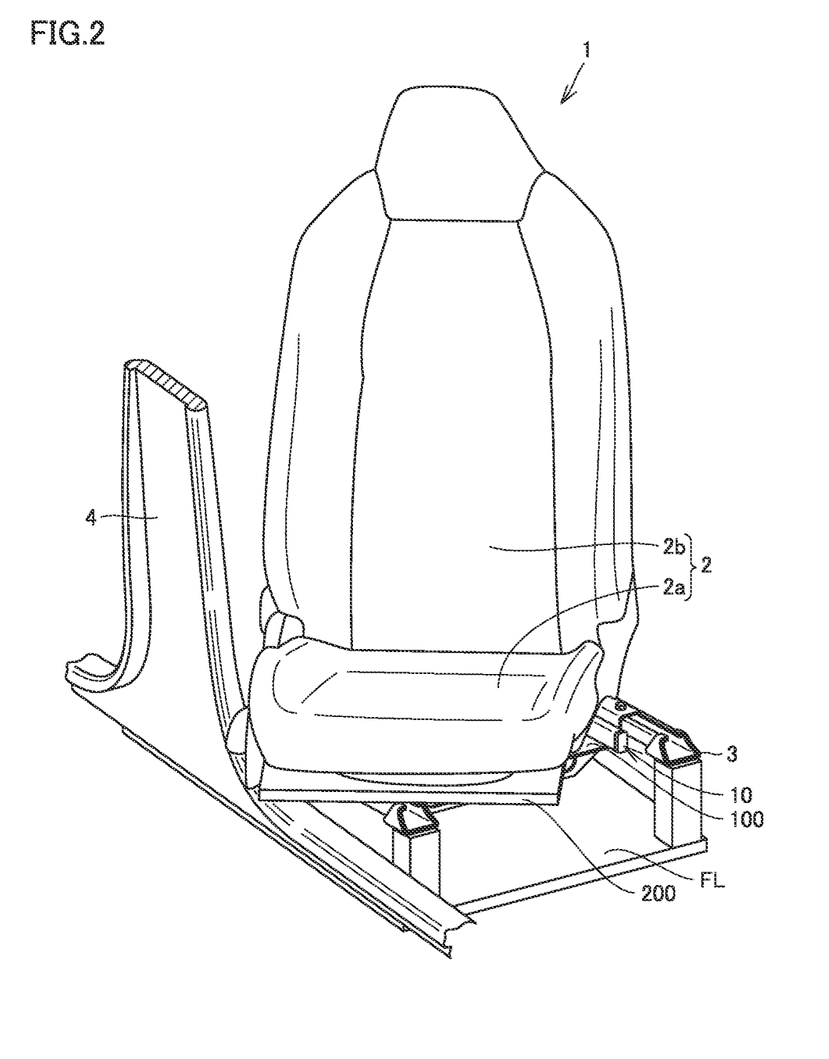
FIG. 2 is a perspective view of the rotary seat at a getting-on and -off position.

FIG. 1 is a perspective view of a rotary seat at a seating position. FIG. 2 is a perspective view of the rotary seat at a getting-on and -off position. This rotary seat 1 functions as a vehicle seat, in particular, as a car seat.

As shown in FIGS. 1 and 2, rotary seat 1 in the present embodiment includes a seat body 2 and a seat rotating device 10.

Seat body 2 includes a seat cushion 2a and a seat back 2b. Seat cushion 2a constitutes a seat. Seat back 2b supports the back of an occupant seated on seat cushion 2a. Seat body 2 is disposed on a floor FL of a vehicle.

A pair of seat sliders 3 that slides seat body 2 in a front-rear direction of the vehicle with respect to floor FL is attached to floor FL. Seat sliders 3 are arranged at a distance from each other in a width direction of the vehicle. Each seat slider 3 includes a lower rail 3a and an upper rail 3b.

Lower rail 3a is fixed to floor FL in a posture in parallel to the front-rear direction of the vehicle. Upper rail 3b is displaceable relatively to lower rail 3a in the front-rear direction of the vehicle (the longitudinal direction of lower rail 3a).

Seat rotating device 10 can rotate seat body 2 between the seating position (the position shown in FIG. 1) and the getting-on and -off position (the position shown in FIG. 2). The seating position refers to a position where seat body 2 faces the front of the vehicle. The getting-on and -off position refers to a position where seat body 2 faces an opening of a door of the vehicle. Seat rotating device 10 is fixed to the lower surface of seat body 2.

Figure 3:
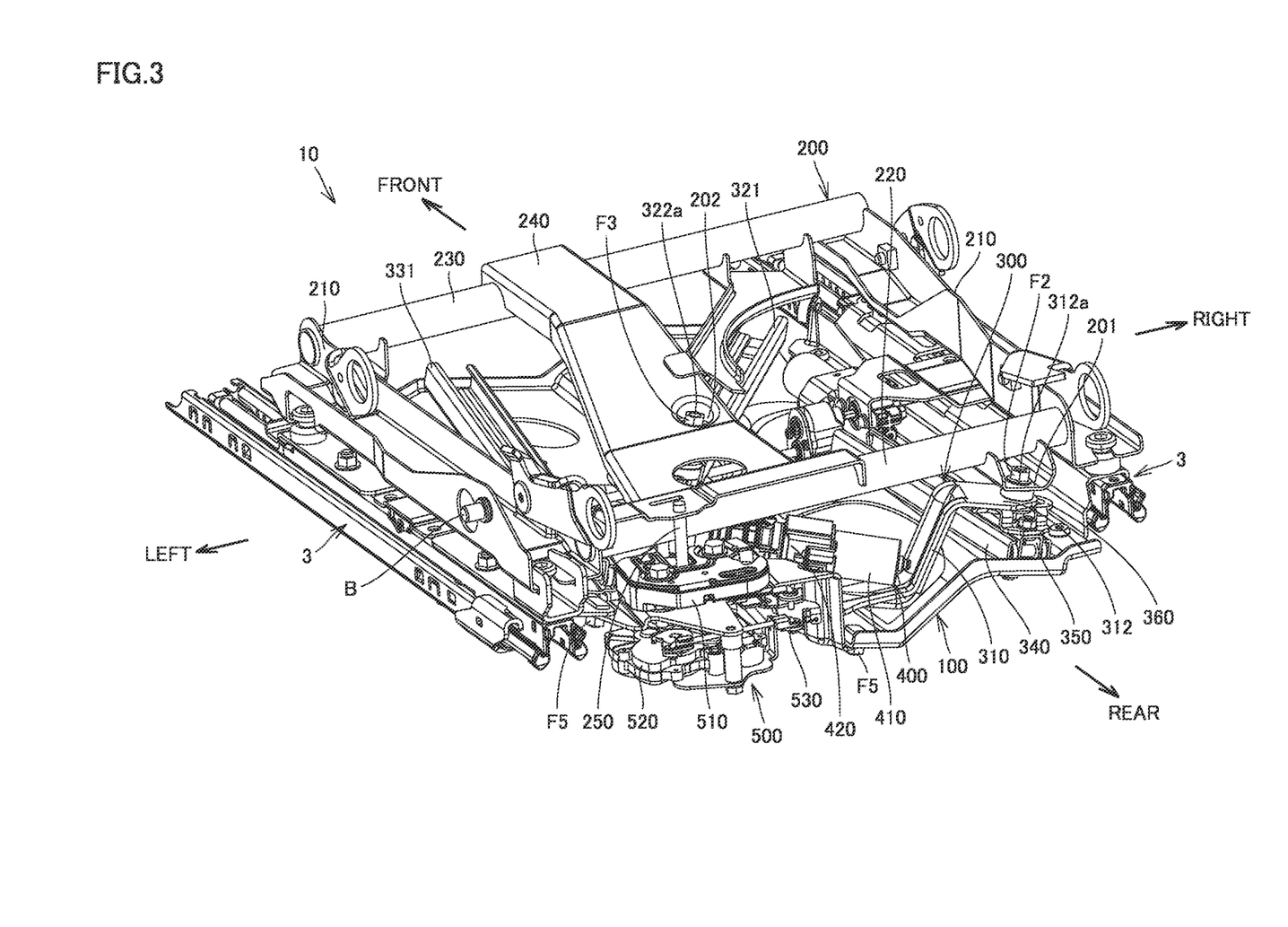
FIG. 3 is a perspective view of a seat rotating device at the seating position in a first embodiment of the present disclosure.
Figure 4:
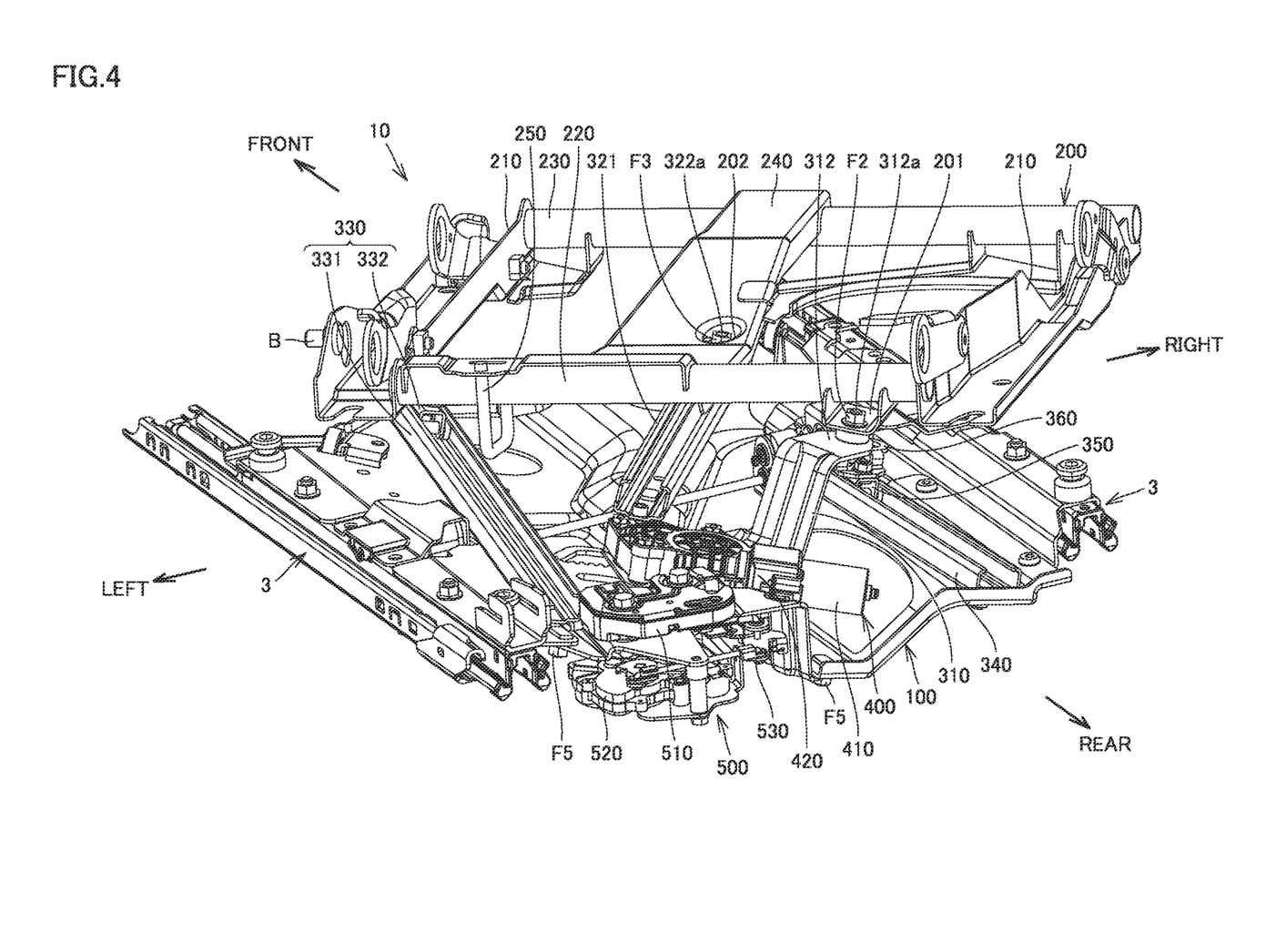
FIG. 4 is a perspective view of the seat rotating device at the getting-on and -off position.

FIG. 3 is a perspective view of the seat rotating device at the seating position in a first embodiment of the present disclosure. FIG. 4 is a perspective view of the seat rotating device at the getting-on and -off position.

As shown in FIGS. 3 and 4, seat rotating device 10 includes a base plate 100, a rotating plate 200, a coupling unit 300, a drive unit 400, and a locking unit 500.

Base plate 100 is fixed directly to floor FL of the vehicle or indirectly to floor FL of the vehicle with another member being interposed. In the present embodiment, base plate 100 is fixed to upper rail 3b. In other words, base plate 100 is fixed to floor FL with seat slider 3 being interposed.

Rotating plate 200 is fixed to the lower surface of seat body 2 so as not to rotate relatively to seat body 2. As shown in FIGS. 3 and 4, rotating plate 200 includes a pair of side brackets 210, a rear pipe 220, a front pipe 230, a coupling plate 240, and a striker 250.

Side brackets 210 are arranged at a distance from each other in the width direction. Each side bracket 210 is arranged above seat slider 3. Each side bracket 210 is in a shape extending in the front-rear direction. In the rear of side bracket 210 arranged on the left in the width direction of the pair of side brackets 210, an anchor (not shown) of a seat belt is fixed by a fixing bolt B.

Rear pipe 220 couples rear portions of side brackets 210 to each other.

Front pipe 230 couples front portions of side brackets 210 to each other.

Coupling plate 240 couples rear pipe 220 and front pipe 230 to each other.

As shown in FIGS. 3 and 4, striker 250 is fixed to a rear end of coupling plate 240. Striker 250 is fixed to coupling plate 240 astride ends of rear pipe 220 on an inner side in the width direction.

Coupling unit 300 couples base plate 100 and rotating plate 200 to each other such that rotating plate 200 is rotatable with respect to base plate 100 between the seating position and the getting-on and -off position.

Coupling unit 300 includes a rotation link 310, a main slider 320, a sub slider 330, a guide rail 340, a support slider 350, and a connection member 360.

Rotation link 310 couples base plate 100 and rotating plate 200 to each other. Rotation link 310 includes a fixing end 311 (see FIG. 5) and a rotating end 312.

Fixing end 311 is formed from one end of rotation link 310. Fixing end 311 is fixed to base plate 100 as being rotatable relatively to base plate 100. Specifically, fixing end 311 is fixed by a fastening member from a rear side of base plate 100. Fixing end 311 is rotatable around a fixing shaft portion 311a which is a central shaft of the fastening member.

Rotating end 312 is formed from the other end of rotation link 310. Rotating end 312 is fixed to rotating plate 200 as being pivotable with respect to base plate 100 around fixing shaft portion 311a of fixing end 311 and being rotatable relatively to rotating plate 200. Specifically, rotating end 312 is fixed to rotating plate 200 by a support shaft portion 312a and a fastening member F2. Support shaft portion 312a is formed from a bolt and fastening member F2 is formed from a nut. Rotating plate 200 is rotatable relatively to rotating end 312 around support shaft portion 312a. A part of rotating plate 200 supported by support shaft portion 312a is denoted as a "first supported portion 201" (see FIGS. 3 and 4) below.

Main slider 320 includes a lower rail 321 and an upper slider 322.

Figure 5:
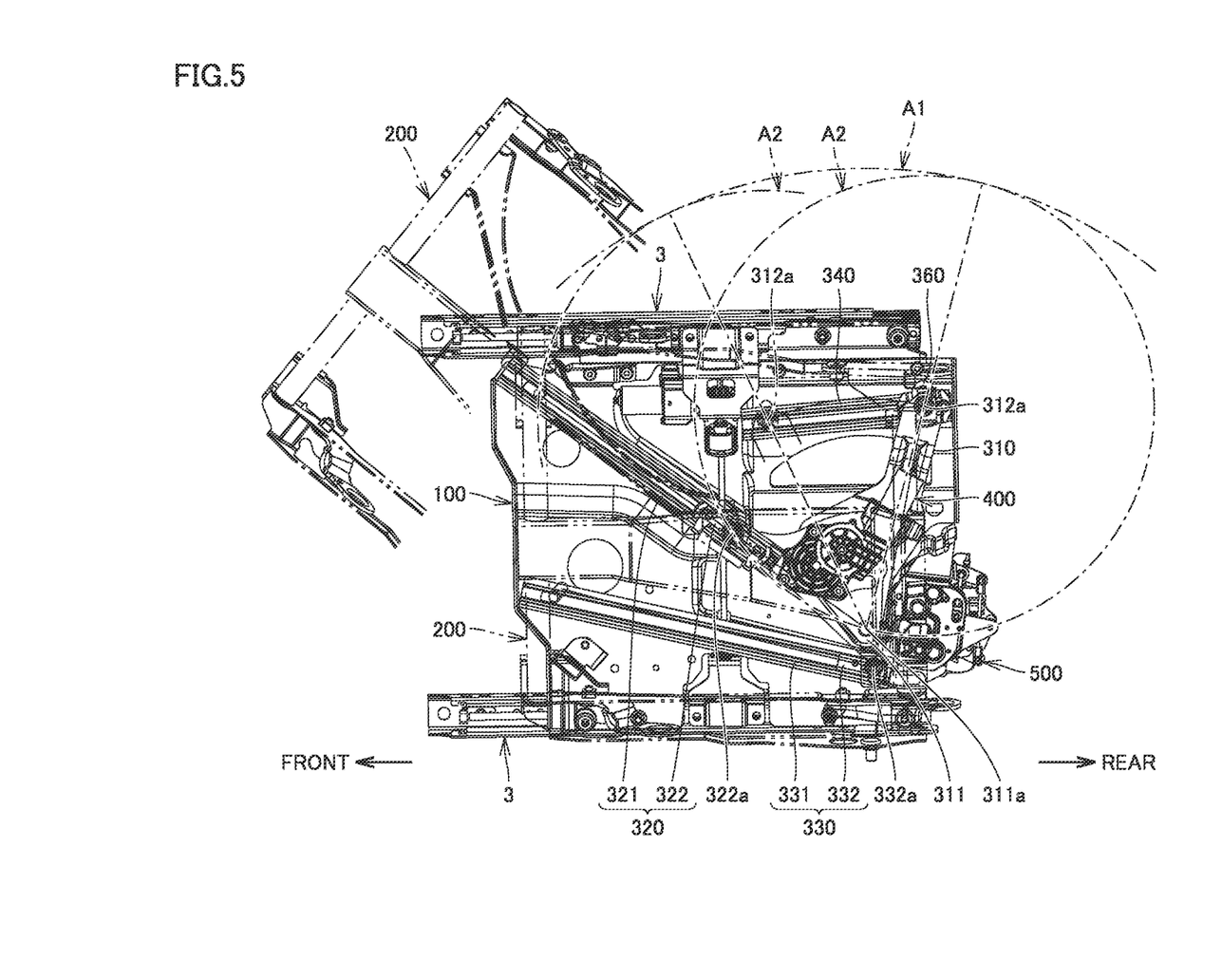
FIG. 5 is a diagram showing positional relation among a base plate, a rotating plate, and a coupling unit at the seating position and the getting-on and -off position.

Lower rail 321 is fixed to base plate 100. Specifically, lower rail 321 is fixed to a central portion of base plate 100. Lower rail 321 is in a linearly extending shape. Lower rail 321 is in a shape linearly extending along a diameter of a virtual circle A1 (see FIG. 5) having a length twice as long as a distance between fixing shaft portion 311a at fixing end 311 and support shaft portion 312a at rotating end 312 as a radius and having fixing shaft portion 311a as the center. FIG. 5 shows with a chain dotted line, virtual circle A1 and a circle A2 having a length between fixing shaft portion 311a and support shaft portion 312a as a radius and having support shaft portion 312a as the center, and shows rotating plate 200 with a chain double-dotted line. An entrance/exit of the vehicle is provided in an upper portion in FIG. 5.

As shown in FIG. 5, lower rail 321 is in a shape linearly extending in a direction intersecting with the front-rear direction of the vehicle and along the diameter of virtual circle A1. Lower rail 321 is inclined with respect to the front-rear direction as gradually coming closer to the opening of the door, in a direction toward the front of the vehicle.

Upper slider 322 is movable along lower rail 321. Upper slider 322 supports rotating plate 200 such that rotating plate 200 is rotatable relatively to upper slider 322. Specifically, upper slider 322 is fixed to rotating plate 200 by a fastening member F3. Rotating plate 200 is rotatable relatively to upper slider 322 around a support shaft portion 322a which is a central shaft of fastening member F3. Support shaft portion 322a is formed from a bolt. A part of rotating plate 200 supported by support shaft portion 322a is denoted as a "second supported portion 202" (see FIGS. 3 and 4) below.

Upper slider 322 allows movement of second supported portion 202 of rotating plate 200 along lower rail 321 while it allows rotation of second supported portion 202 relatively to upper slider 322 in the direction the same as a direction of rotation (clockwise in FIG. 5) of rotating plate 200 with respect to rotating end 312 when rotating plate 200 moves from the seating position to the getting-on and -off position.

Support shaft portion 322a of upper slider 322 moves along a locus (the diameter of virtual circle A1) of a point on circle A2 at the time of rotation of circle A2 as being inscribed in virtual circle A1 when seat body 2 moves between the seating position and the getting-on and -off position.

Sub slider 330 includes a lower rail 331 and an upper slider 332.

Lower rail 331 is fixed to base plate 100. Specifically, lower rail 331 is fixed to a part of base plate 100 located between seat slider 3 arranged on the inner side in the width direction and lower rail 321 of main slider 320. Lower rail 331 has a linearly extending shape. As shown in FIG. 5, lower rail 331 is fixed to base plate 100 in such a posture that an extension of lower rail 331 does not pass through fixing shaft portion 311a which is the center of virtual circle A1. Lower rail 331 is inclined with respect to the front-rear direction as gradually coming closer to the opening of the door, in the direction toward the front of the vehicle.

Upper slider 332 is movable along lower rail 331. Upper slider 332 supports rotating plate 200 such that rotating plate 200 is rotatable relatively to upper slider 332. Specifically, upper slider 332 is fixed to rotating plate 200 by a fastening member (not shown). Rotating plate 200 is rotatable relatively to upper slider 332 around a support shaft portion 332a (see FIG. 5) which is a central shaft of the fastening member. A part of rotating plate 200 supported by support shaft portion 332a is denoted as a "third supported portion" below.

Upper slider 322 allows movement of the third supported portion of rotating plate 200 along lower rail 331 while it allows rotation of the third supported portion relatively to upper slider 332 in a direction the same as the direction (clockwise in FIG. 5) of rotation of rotating plate 200 with respect to rotating end 312 when rotating plate 200 moves from the seating position to the getting-on and -off position.

Figure 6:
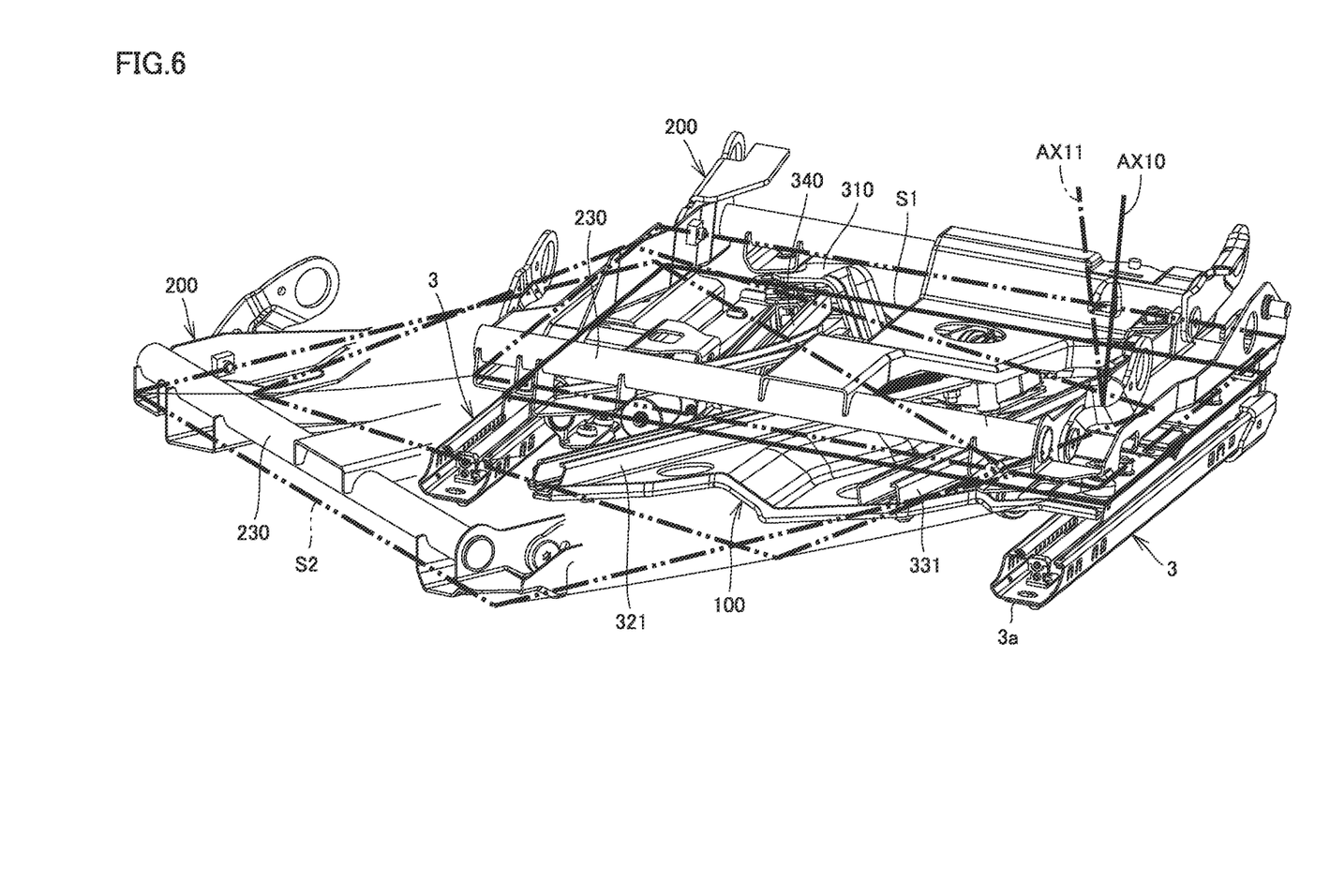
FIGS. 6 and 7 are each a diagram for illustrating relation between an inclination of a fixing shaft portion and a seat surface.
Figure 7:
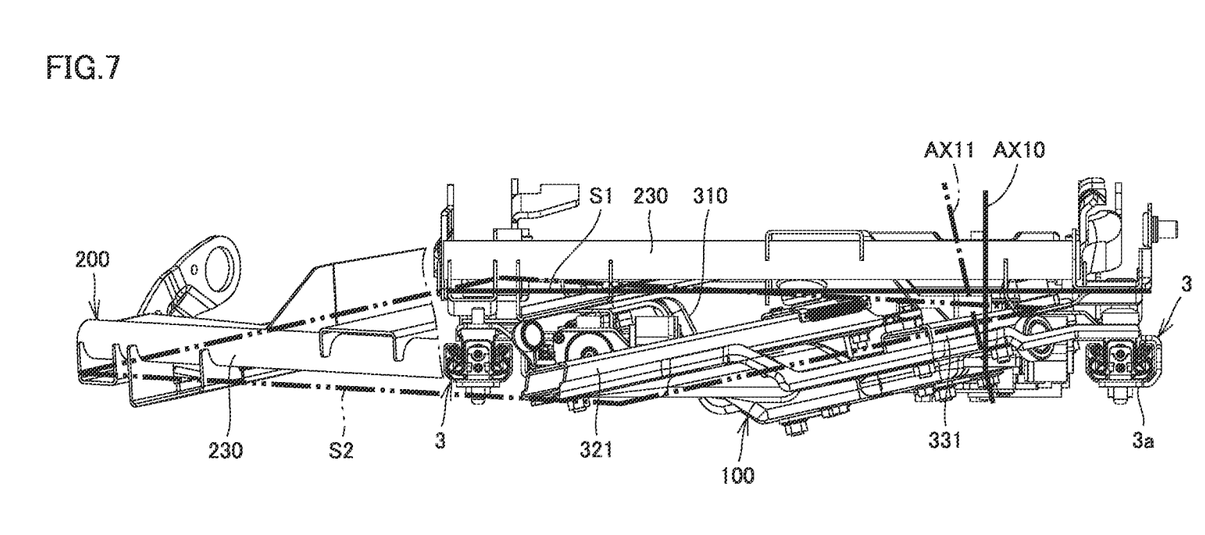

As shown in FIGS. 6 and 7, an extension AX11 of fixing shaft portion 311a of fixing end 311 in rotation link 310 is inclined with respect to a reference axis AX10 in parallel to a direction orthogonal to a bottom surface of lower rail 3a in seat slider 3. A seat surface S2 of seat cushion 2a at the getting-on and -off position is thus in a posture inclined downward, in a direction toward the front. Seat surface S2 is in a posture gradually inclined downward, in a direction toward the opening of the door of the vehicle (toward the right when viewed from an occupant who is seated on seat cushion 2a in the present embodiment). Therefore, it becomes easier to get on and off the vehicle at the getting-on and -off position. FIGS. 6 and 7 show a seat surface S1 of seat cushion 2a at the seating position with a solid line and shows seat surface S2 of seat cushion 2a at the getting-on and -off position with a chain double-dotted line.

Drive unit 400 drives coupling unit 300. Drive unit 400 is fixed to base plate 100. Drive unit 400 can rotate rotation link 310 around fixing end 311. Drive unit 400 includes a motor 410 and a gear 420 that transmits output from motor 410 to rotation link 310.

For example, when motor 410 is driven while rotating plate 200 is located at the seating position, rotation link 310 rotates around fixing end 311 and upper sliders 322 and 332 move forward along respective lower rails 321 and 331. Rotating plate 200 thus rotates toward the entrance/exit while it moves forward with respect to base plate 100. Consequently, rotating plate 200 is located at the getting-on and -off position.

Locking unit 500 locks rotating plate 200 at the seating position. As shown in FIGS. 3 and 4, locking unit 500 is fixed to base plate 100 by a fastening member F5. Locking unit 5 includes a locking apparatus 510, a release actuator 520, and a transmission portion 530.

Locking apparatus 510 can lock striker 250. Locking apparatus 510 includes a hook movable between a locking position and an unlocking position. The locking position is a position where striker 250 is held while rotating plate 200 is located at the seating position. The unlocking position is a position where detachment of striker 250 is permitted.

Release actuator 520 is formed from a member different from a member for locking apparatus 510. Release actuator 520 is an apparatus for releasing locking of striker 250 by locking apparatus 510.

Transmission portion 530 transmits output from release actuator 520 to locking apparatus 510. Transmission portion 530 includes a link mechanism.

Figure 8:
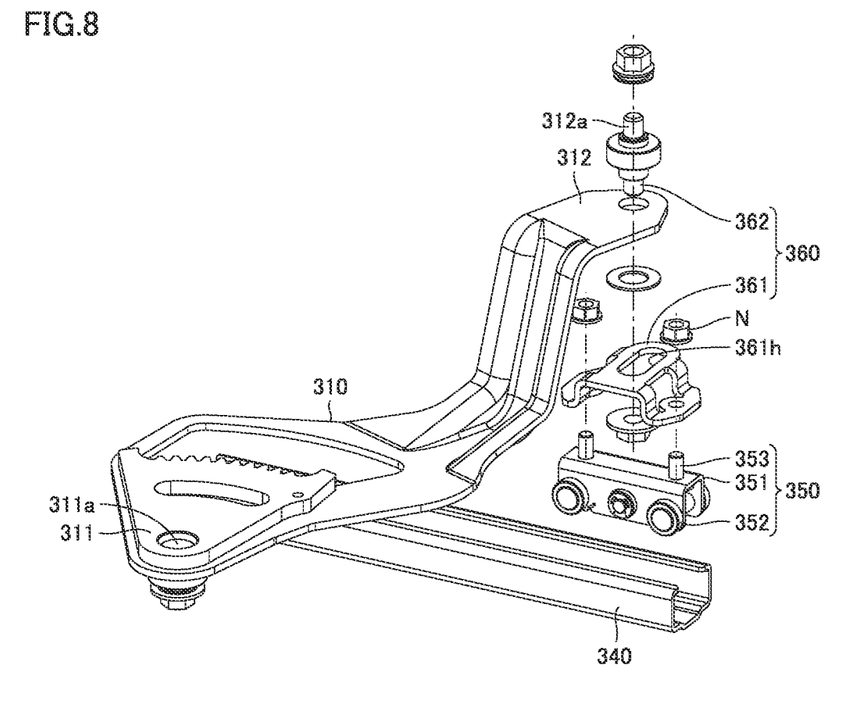
FIG. 8 is an exploded perspective view of a rotation link, a guide rail, a support slider, and a connection member.

Guide rail 340, support slider 350, and connection member 360 will now be described in detail with reference to FIGS. 8 and 9.

Guide rail 340 is fixed to base plate 100. Guide rail 340 is in a linearly extending shape. Guide rail 340 opens upward. Guide rail 340 is arranged in the vicinity of rotating end 312 of rotation link 310. More specifically, as shown in FIG. 9, guide rail 340 is arranged at a position below a locus of movement T of rotating end 312, as being superimposed on locus T.

Support slider 350 is movable along guide rail 340. Support slider 350 is a slider for supporting rotating end 312. Support slider 350 includes an upper rail 351, a roller 352, and a pair of support bolts 353.

Upper rail 351 is in a shape opening downward. A length of upper rail 351 in a direction in parallel to the longitudinal direction of guide rail 340 is shorter than a length of guide rail 340 in that direction.

Roller 352 is held by upper rail 351. Roller 352 rotates as being in contact with an inner surface of guide rail 340.

Each support bolt 353 is fixed to an upper surface of upper rail 351 by welding or the like. Each support bolt 353 is in a shape extending upward from the upper surface of upper rail 351. Each support bolt 353 is fixed to an end of upper rail 351 in the longitudinal direction of upper rail 351.

Connection member 360 connects support slider 350 and rotation link 310 to each other. Connection member 360 connects support slider 350 and rotation link 310 to each other such that rotating end 312 is rotatable relatively to connection member 360. Connection member 360 is constructed to accommodate variation in distance between rotating end 312 and support slider 350 that is produced when rotating end 312 and support slider 350 move with respect to base plate 100. In the present embodiment, connection member 360 includes a bracket 361 and a coupling portion 362.

Bracket 361 is fixed to support slider 350. Specifically, bracket 361 is fixed to upper rail 351 by support bolt 353 and a nut N. Bracket 361 is provided with a long hole 361h in a shape extending in a direction intersecting with the longitudinal direction of guide rail 340. Long hole 361h is preferably orthogonal to both of the longitudinal direction of guide rail 340 and an upward-downward direction.

Coupling portion 362 couples rotating end 312 and bracket 361 to each other while it is located in long hole 361*h*. Coupling portion 362 is movable within long hole 361*h*. Coupling portion 362 is fixed to rotating end 312. Coupling portion 362 is in a shape extending downward from rotating end 312. In the present embodiment, coupling portion 362 is formed from a bolt coaxial with support shaft portion 312*a*. Coupling portion 362 may be formed from a bolt with a central shaft different from the central shaft of support shaft portion 312*a*.

Figure 9:
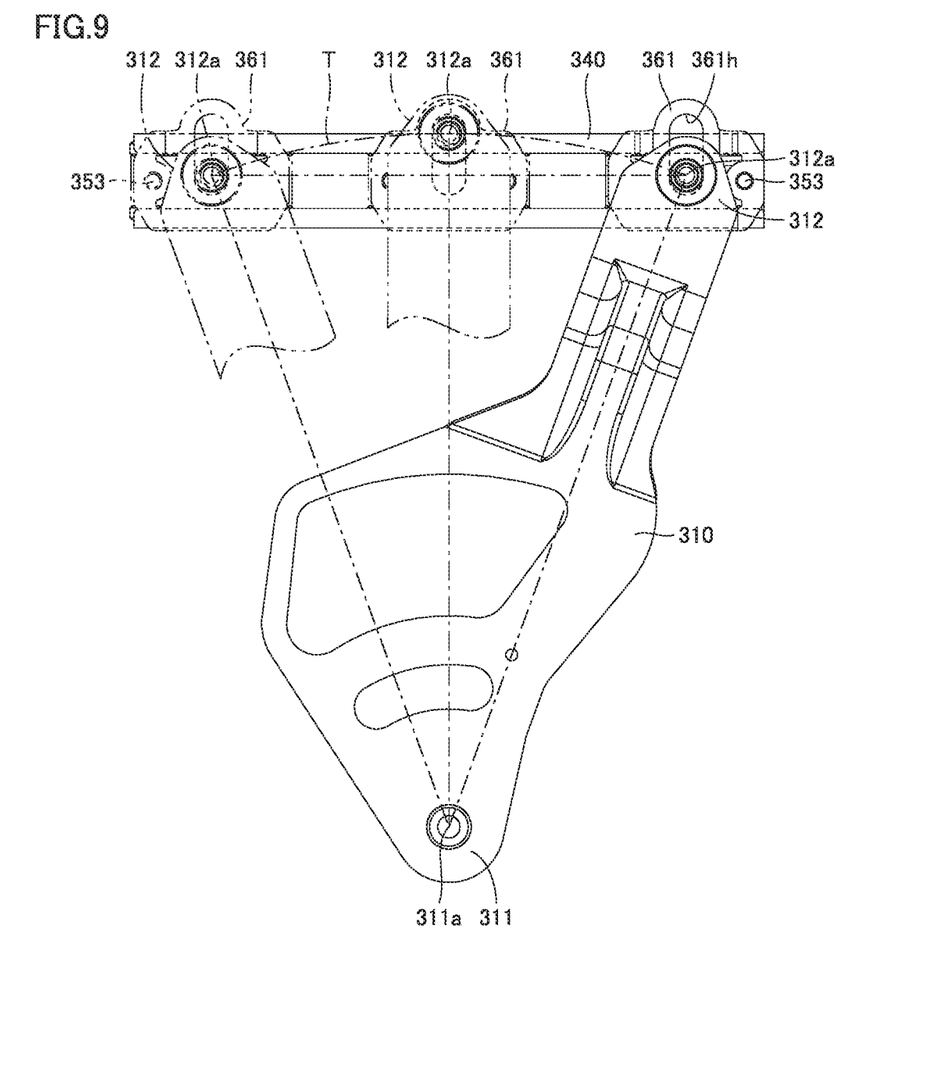
FIG. 9 is a diagram for illustrating positional relation between a locus of movement of a support shaft portion and the connection member at a rotating end.

FIG. 9 shows positional relation between locus of movement T of support shaft portion 312*a* and connection member 360 at rotating end 312. FIG. 9 shows with a solid line, rotation link 310, support shaft portion 312*a*, and bracket 361 while rotating plate 200 is located at the seating position and shows with a chain double-dotted line, rotating end 312, support shaft portion 312*a*, and bracket 361 while rotating plate 200 is located at the getting-on and -off position and when rotating plate 200 is located at a position intermediate between the seating position and the getting-on and -off position.

As shown in FIG. 9, while rotating plate 200 is located at the seating position and the getting-on and -off position, support shaft portion 312*a* and coupling portion 362 are located on one end side (a lower side in FIG. 9) of long hole 361*h* in bracket 361 whereas while rotating plate 200 is located at the intermediate position, support shaft portion 312*a* and coupling portion 362 are located on the other end side (an upper side in FIG. 9) of long hole 361*h*. Bracket 361 and coupling portion 362 can thus accommodate variation in distance between rotating end 312 and support slider 350 that is produced when rotating end 312 and support slider 350 move with respect to base plate 100.

In seat rotating device 10 described above, rigidity of base plate 100 is effectively ensured by fixing of guide rail 340 to base plate 100. Furthermore, connection member 360 is constructed to accommodate variation in distance between rotating end 312 and support slider 350 that is produced when rotating end 312 and support slider 350 move with respect to base plate 100, and guide rail 340 is in the linearly extending shape. Therefore, design of guide rail 340 and support slider 350 is facilitated.

Second Embodiment

Support slider 350 and connection member 360 of seat rotating device 10 in a second embodiment of the present disclosure will now be described with reference to FIGS. 10 and 11. In the second embodiment, only a difference from the first embodiment will be described, and description of the structure and functions and effects the same as those in the first embodiment will not be repeated.

Figure 10:
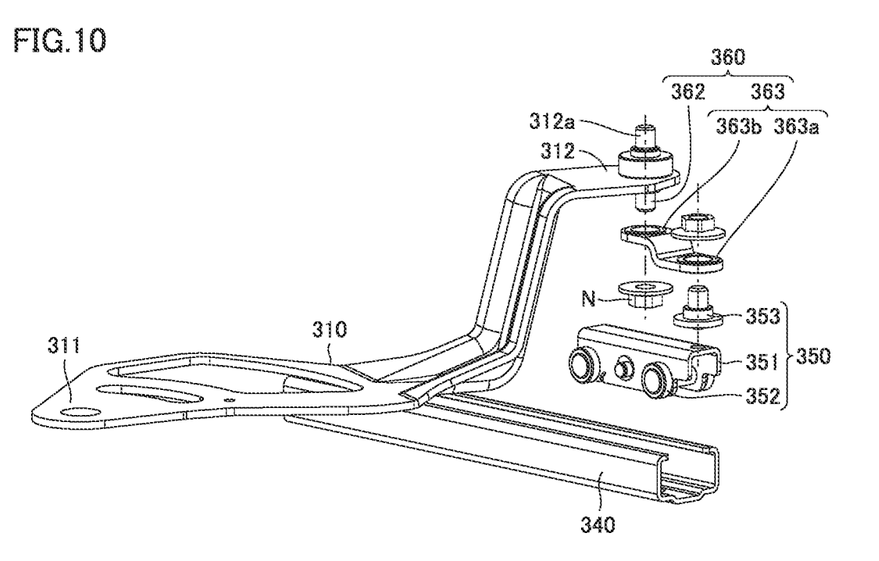
FIG. 10 is an exploded perspective view of the rotation link, the guide rail, the support slider, and the connection member of the seat rotating device in a second embodiment of the present disclosure.
Figure 11:
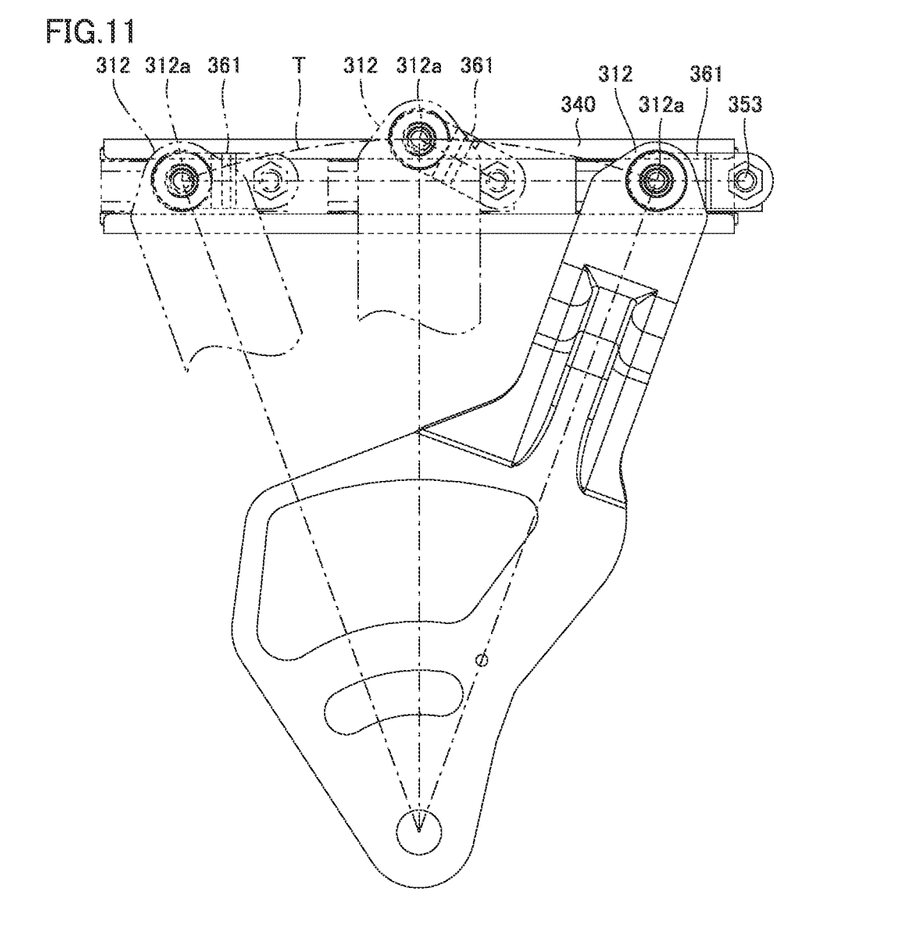
FIG. 11 is a diagram for illustrating positional relation between the locus of movement of the support shaft portion and the connection member at the rotating end.

As shown in FIGS. 10 and 11, in the present embodiment, support slider 350 includes a single support bolt 353. Support bolt 353 is formed from a shoulder bolt and fixed to the upper surface of upper rail 351 by welding, caulking, or the like.

Connection member 360 includes a link 363 and coupling portion 362.

Link 363 includes a first end 363*a* and a second end 363*b*. First end 363*a* is formed from one end of link 363. First end 363*a* is connected to support slider 350 as being rotatable relatively to support slider 350. First end 363*a* is fixed to upper rail 351 by support bolt 353 and the nut. Second end 363*b* is formed from the other end of link 363. Second end 363*b* is rotatable around first end 363*a*. Second end 363*b* is fixed to rotating end 312 by coupling portion 362 and nut N as being rotatable relatively to rotating end 312. In other words, coupling portion 362 couples rotating end 312 and second end 363*b* to each other such that second end 363*b* is rotatable relatively to rotating end 312.

FIG. 11 shows positional relation between locus of movement T of support shaft portion 312*a* and connection member 360 at rotating end 312. As shown in FIG. 11, while rotating plate 200 is located at the seating position and the getting-on and -off position, support shaft portion 312*a* and coupling portion 362 are located above the locus of movement of support bolt 353, whereas while rotating plate 200 is located at the intermediate position, support shaft portion 312*a* and coupling portion 362 are distant from the locus of movement of support bolt 353 because of rotation of link 363 around first end 363*a*. Link 363 and coupling portion 362 can thus accommodate variation in distance between rotating end 312 and support slider 350 that is produced when rotating end 312 and support slider 350 move with respect to base plate 100.

An illustrative embodiment described above is understood by a person skilled in the art as specific examples of aspects below.

(Aspect 1)

A seat rotating device that rotates a seat body between a seating position where the seat body faces the front of a vehicle and a getting-on and -off position where the seat body faces an opening of a door of the vehicle, the seat rotating device including: a base plate fixed to a floor of the vehicle; a rotating plate fixed to a lower surface of the seat body so as not to rotate relatively to the seat body; and a coupling unit that couples the base plate and the rotating plate to each other such that the rotating plate is rotatable with respect to the base plate between the seating position and the getting-on and -off position. The coupling unit includes a rotation link that couples the base plate and the rotating plate to each other, the rotation link including a fixing end and a rotating end, the fixing end being fixed to the base plate as being rotatable relatively to the base plate, the rotating end being fixed to the rotating plate as being pivotable with respect to the base plate around the fixing end and rotatable relatively to the rotating plate, a guide rail fixed to the base plate, the guide rail being in a linearly extending shape, a support slider movable along the guide rail, the support slider supporting the rotating end, a connection member that connects the support slider and the rotation link to each other, the connection member connecting the support slider and the rotation link to each other such that the rotating end is rotatable relatively to the connection member, a lower rail fixed to the base plate, and an upper slider movable along the lower rail, the upper slider supporting the rotating plate such that the rotating plate is rotatable relatively to the upper slider. The rotating plate includes a first supported portion supported by the rotating end and a second supported portion distant from the first supported portion, the second supported portion being supported by the upper slider. The upper slider allows movement of the second supported portion along the lower rail while the upper slider allows rotation of the rotating plate relatively to the upper slider in a direction identical to a direction of rotation of the rotating plate with respect to the rotating end when the rotating plate moves from the seating position to the getting-on and -off position. The connection member is constructed to accommodate variation in distance between the rotating end and the support slider that is produced when the rotating end and the support slider move with respect to the base plate.

In this seat rotating device, as the guide rail is fixed to the base plate, rigidity of the base plate is effectively ensured. Furthermore, the connection member is constructed to accommodate variation in distance between the rotating end and the support slider that is produced when the rotating end and the support slider move with respect to the base plate, and the guide rail is in a linearly extending shape. Therefore, design of the guide rail and the support slider is facilitated.
(Aspect 2)

In the seat rotating device described in Aspect 1, the guide rail is arranged at a position below a locus of movement of the rotating end, as being superimposed on the locus of movement.

In this aspect, since the distance between the support slider and the rotating end is reduced, the connection member can be reduced in size. Load inputted to the rotating end is effectively received by the guide rail.
(Aspect 3)

In the seat rotating device described in Aspect 1 or 2, the connection member includes a bracket provided with a long hole in a shape extending in a direction intersecting with a longitudinal direction of the guide rail, the bracket being fixed to the support slider, and a coupling portion that couples the rotating end and the bracket to each other while the coupling portion is located in the long hole, the coupling portion being movable in the long hole.
(Aspect 4)

In the seat rotating device described in Aspect 1 or 2, the connection member includes a link including a first end and a second end, the first end being connected to the support slider as being rotatable relatively to the support slider, the second end being rotatable around the first end, and a coupling portion that couples the rotating end and the second end to each other such that the second end is rotatable relatively to the rotating end.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A seat rotating device that rotates a seat body between a seating position where the seat body faces front of a vehicle and a getting-on and-off position where the seat body faces an opening of a door of the vehicle, the seat rotating device comprising:
    a base plate fixed to a floor of the vehicle;
    a rotating plate fixed to a lower surface of the seat body so as not to rotate relatively to the seat body; and
    a coupling unit that couples the base plate and the rotating plate to each other such that the rotating plate is rotatable with respect to the base plate between the seating position and the getting-on and-off position, wherein
    the coupling unit includes
        a rotation link that couples the base plate and the rotating plate to each other, the rotation link including a fixing end and a rotating end, the fixing end being fixed to the base plate as being rotatable relatively to the base plate, the rotating end being fixed to the rotating plate as being pivotable with respect to the base plate around the fixing end and rotatable relatively to the rotating plate,
        a guide rail fixed to the base plate, the guide rail being in a linearly extending shape,
        a support slider movable along the guide rail, the support slider supporting the rotating end,
        a connection member that connects the support slider and the rotation link to each other, the connection member connecting the support slider and the rotation link to each other such that the rotating end is rotatable relatively to the connection member,
        a lower rail fixed to the base plate, and
        an upper slider movable along the lower rail, the upper slider supporting the rotating plate such that the rotating plate is rotatable relatively to the upper slider,
    the rotating plate includes
        a first supported portion supported by the rotating end, and
        a second supported portion distant from the first supported portion, the second supported portion being supported by the upper slider,
    the upper slider allows movement of the second supported portion along the lower rail while the upper slider allows rotation of the rotating plate relatively to the upper slider in a direction identical to a direction of rotation of the rotating plate with respect to the rotating end when the rotating plate moves from the seating position to the getting-on and-off position, and
    the connection member is constructed to accommodate variation in distance between the rotating end and the support slider that is produced when the rotating end and the support slider move with respect to the base plate.

2. The seat rotating device according to claim 1, wherein the guide rail is arranged at a position below a locus of movement of the rotating end, as being superimposed on the locus of movement.

3. The seat rotating device according to claim 1, wherein the connection member includes
    a bracket provided with a long hole in a shape extending in a direction intersecting with a longitudinal direction of the guide rail, the bracket being fixed to the support slider, and
    a coupling portion that couples the rotating end and the bracket to each other while the coupling portion is located in the long hole, the coupling portion being movable in the long hole.

4. The seat rotating device according to claim 1, wherein the connection member includes
    a link including a first end and a second end, the first end being connected to the support slider as being rotatable relatively to the support slider, the second end being rotatable around the first end, and
    a coupling portion that couples the rotating end and the second end to each other such that the second end is rotatable relatively to the rotating end.

* * * * *